2,891,036
POLYETHYLENE COMPOSITIONS CONTAINING CERTAIN ETHYNYL ALCOHOLS

Charles L. Stacy, Jr. and Roger F. Monroe, Midland, Mich., assignors to The Dow Chemical Company, Midland, Mich., a corporation of Delaware No Drawing. Application April 9, 1956
Serial No. 576,779

5 Claims. (Cl. 260—45.95)

This invention relates to compositions of essentially linear and unbranched polyethylene and like polymers having relatively high molecular weights that are stabilized to thermal oxidation and has as among its principal objectives the provision of such compositions.

Polyolefins, particularly polyethylene, may advantageously be prepared having relatively high apparent molecular weights (as may be determined, for example, by measurement of such characteristics as melt viscosity and the like) and greater densities according to a process first proposed by Dr. Karl Ziegler and his associates in Germany. In this process, ethylene and other olefins may be polymerized under relatively low pressures ranging from 1 to 100 atmospheres with catalyst mixtures of strong reducing agents and compounds of groups IV–B, V–B and VI–B metals of the periodic system. Aluminum alkyls admixed with salts of titanium, zirconium or vanadium, particularly the halogen or halogen-containing salts thereof, may be utilized with especial benefit in this process.

Polymers of this nature, particularly polyethylene frequently have apparent molecular weights which are significantly greater than similar polymeric materials prepared by other methods, such as those which may be obtained by polymerizing ethylene in a basic aqueous medium in the presence of polymerization-favoring quantities of oxygen under relatively high pressures in excess of 500 or 1,000 atmospheres at temperatures between 150 and 275° C. It is not unusual for the essentially linear and unbranched polyethylene prepared according to the Ziegler process to have apparent molecular weights which are in excess of 40,000 and even as high as in the neighborhood of 3,000,000.

In addition, the essentially linear and unbranched polymers of ethylene have greater densities, usually of at least about 0.94–0.96 gram per cubic centimeter, and are more resistant to the softening effects of heat. Generally, they have higher softening, melting and heat distortion temperatures. Usually, for example, their melting points are in the neighborhood of 125–135° C. They are essentially linear and unbranched polymers that may be found to have less than 3.0 and frequently even less than 0.03 substituent methyl groups per 100 methylene units in the polymer molecule. They are also more crystalline in nature than conventionally prepared polymers of this type.

In certain instances, however, polyethylene and like polymers prepared according to the Ziegler process may tend to have corrosive propensities upon being molded, especially when halogen-containing catalysts have been employed in their manufacture, due to their retaining minor residual quantities of the catalyst after polymerization. It would be advantageous to provide stabilized compositions comprising essentially linear and unbranched polymers of this type that, besides having improved thermal stability and a reduced susceptibility to the degradative effects of oxidation, would have a substantially lessened propensity to be corrosive upon molding, even after having been prepared with halogen-containing catalyst materials. Such propitious characteristics would, to a greater extent, ensure that moldings and other articles fabricated from the polymers would have an enhanced color and appearance in comparison with unstabilized compositions of the same polymer.

These and other advantages and benefits may be achieved in accordance with the compositions provided by the present invention which comprise an essentially linear and unbranched polyethylene prepared according to the hereindescribed Ziegler process and a stabilizing quantity of an ethynyl alcohol. Ethynyl cyclohexanol, 2-ethynyl-4-tert.-butyl cyclohexanol, and diethynyl alcoholic materials which contain in the neighborhood of 12 carbon atoms in their molecules, as well as 2,4,7,9-tetramethyl-5-decyne-4,7-diol (which may be obtained under the trademark "Surfynol 104" from the Air Reduction Chemical Company), are illustrative of the compounds that may be utilized beneficially in the practice of the invention. Advantageously, the ethynyl alcohol which is employed and which is an alkynyl alcohol that sometimes may be referred to as a tertiary acetylenic alcohol has a sufficient boiling point to enable it to be employed without excessive vaporization in compositions that may be molded or fabricated at temperatures as high as about 185° C. and higher. An amount of the ethynyl alcohol between about 0.005 and 5.0 percent by weight and frequently between about 0.01 and 2.0 percent by weight, based on the weight of the polyethylene or like polymer, may advantageously be incorporated in the composition to stabilize it. Ordinarily, an amount of about 0.1 percent by weight may be employed satisfactorily.

The ethynyl alcohol may be incorporated in the composition in any desired or conventional manner. Frequently it may be expedient to incorporate it from a liquid dispersion in which it may be dissolved in a suitable solvent substance as xylene, toluene and the like.

In a series of illustrative examples, individual samples of essentially linear and unbranched polyethylene prepared with a halogen-containing catalyst according to the Ziegler process and having an apparent molecular weight of about 60,000 were stabilized by incorporating about 0.1 percent by weight of ethynyl cyclohexanol and the same amount of 2-ethynyl-4-tert.-butyl cyclohexanol in the polymer. The samples were prepared by blending a solution of the ethynyl alcohols in o-xylene with the freshly prepared polymer in powdered form to form a slurry, drying the slurry at 110° C. for about two hours, and then compression molding the stabilized compositions into test specimens at a temperature of about 185° C. Each of the stabilized compositions were exposed to oxygen at a temperature of about 150° C. to observe their stability to thermal oxidation. For purposes of comparison, an unstabilized sample of the polymer was molded and tested with the stabilized specimens along with a sample that had been stabilized with about 0.1 percent by weight of dibutyl tin maleate, a stabilizing material that is frequently employed for such purposes. The various compositions had relative degrees of stabilization, based on an arbitrarily selected rating scale, which were represented by the numerical values in the following table. The table also includes the relative rate of oxidation which was observed for each of the compounds with respect to that of the unstabilized composition whose oxidation rate was arbitrarily designated as being unity.

| Run | Stabilizer | Relative Degree of Stabilization | Relative Rate of Oxidation |
|---|---|---|---|
| A | Blank (no stabilizer) | 0.6 | 1.00 |
| B | Ethynyl cyclohexanol | 0.8 | 0.655 |
| C | 2-Ethynyl-4-tert.-butyl cyclohexanol | 1.2 | 0.622 |
| D | Dibutyl tin maleate | 1.0 | 0.655 |

In addition, the test specimens that were molded from the ethynyl alcohol-containing compositions in accordance with the invention did not tend to corrode the mold while the unstabilized composition displayed distinct evidences of corrosiveness upon being molded. The ethynyl alcohol-containing specimens had an excellent color in comparison to the specimen from the unstabilized composition.

Similar excellent results may be obtained when "Surfynol 104" and other ethynyl alcohols are employed as stabilizers for essentially linear and unbranched polymers of ethylene and like polymers prepared according to the Ziegler process.

Many of the ethynyl alcohols may be employed for the preparation of stabilized compositions in accordance with the invention that have non-toxic characteristics so as to permit their safe use in association with foodstuffs. Furthermore, certain of the ethynyl alcohols, such as "Surfynol 104" may benefit the mold release characteristics of the polyethylene compositions in which they are employed.

What is claimed is:

1. A stabilized composition comprising an essentially linear and unbranched polyethylene having a density of at least about 0.94–0.96 gram per cubic centimeter and a melting point in the neighborhood of 125–135° C. and between about 0.005 and 5.0 percent by weight of an ethynyl alcohol selected from the group consisting of ethynyl cyclohexanol, 2-ethynyl-4-tert.-butyl cyclohexanol and 2,4,7,9-tetramethyl-5-decyne-4,7-diol.

2. The composition of claim 1 wherein the polyethylene has been prepared by polymerizing ethylene under relatively low pressures in the presence of a Ziegler-type halogen-containing catalyst that is an admixture of an aluminum alkyl and a halogen salt of a metal selected from the group of metals consisting of those in groups IV–B, V–B, and VI–B of the periodic system and retains minor proportions of said catalyst as a residue after its polymerization.

3. The composition of claim 1 wherein the ethynyl alcohol is ethynyl cyclohexanol.

4. The composition of claim 1 wherein the ethynyl alcohol is 2-ethynyl-4-tert.-butyl cyclohexanol.

5. A composition according to claim 1 which comprises the polyethylene and between about 0.01 and 2.0 percent by weight of the ethynyl alcohol.

References Cited in the file of this patent

UNITED STATES PATENTS

| | | |
|---|---|---|
| 2,603,622 | Berger | July 15, 1952 |
| 2,762,791 | Pease et al. | Sept. 11, 1956 |

FOREIGN PATENTS

| | | |
|---|---|---|
| 533,362 | Belgium | May 16, 1955 |